United States Patent [19]
Feldman et al.

[11] 3,943,529
[45] Mar. 9, 1976

[54] CONTROL OF SCANNING LASER BEAM

[75] Inventors: Martin Feldman, Murray Hill; Joseph Michael Moran, Berkeley Heights, both of N.J.

[73] Assignee: Bell Telephone Laboratories, Incorporated, Murray Hill, N.J.

[22] Filed: Feb. 6, 1975

[21] Appl. No.: 547,555

[52] U.S. Cl. ............ 346/108; 178/7.6; 219/121 LM
[51] Int. Cl.².... G01D 9/42; H04N 3/00; B23K 9/00
[58] Field of Search...................... 346/75, 76, 108; 219/121 EM, 121 LM; 178/7.6

[56] References Cited
UNITED STATES PATENTS

| | | | |
|---|---|---|---|
| 2,222,934 | 11/1940 | Blumlein | 178/6.8 |
| 2,485,556 | 10/1949 | Bion | 178/6.8 |
| 3,166,752 | 1/1965 | Waterman | 346/139 A X |
| 3,200,195 | 3/1965 | Davies et al. | 178/6.8 |
| 3,389,403 | 6/1968 | Cottingham et al. | 346/108 |
| 3,441,949 | 4/1969 | Rolon | 346/108 |
| 3,448,458 | 6/1969 | Carlson et al. | 346/76 X |
| 3,573,847 | 4/1971 | Sacerdoti | 346/76 |
| 3,573,849 | 4/1971 | Herriot et al. | 346/108 |
| 3,622,742 | 11/1971 | Cohen et al. | 219/121 L |
| 3,700,850 | 10/1972 | Lumley et al. | 219/121 LM |
| 3,812,371 | 5/1974 | Chin | 346/108 X |
| 3,813,676 | 5/1974 | Wolfe | 346/75 |

*Primary Examiner*—George H. Miller, Jr.
*Attorney, Agent, or Firm*—R. B. Anderson; L. C. Canapa

[57] ABSTRACT

In pattern generating apparatus of the type employing a reciprocating laser beam for scanning a substrate surface, three scan lines are formed simultaneously. During reciprocation in one direction, the beam is deflected upwardly at an angle of arccot (1/3) with respect to the reciprocating direction, and during reciprocation in the opposite direction, the beam is deflected downwardly at an angle of arccot (1/3).

14 Claims, 5 Drawing Figures

CONTROL OF SCANNING LASER BEAM

BACKGROUND OF THE INVENTION

This invention relates to reproducing apparatus, and more particularly, to apparatus for generating patterns from information stored in a computer or similar storage apparatus.

The copending application of Firtion et al. Ser. No. 496,150, filed Aug. 9, 1974, and assigned to Bell Telephone Laboratories, Incorporated, describes a pattern generating machine comprising a modulated laser writing beam which scans a substrate to form a pattern by laser machining. As described in that case, laser machining of an iron oxide film is an effective way for forming the detailed patterns required in the production of integrated circuit masks. The writing beam is reflected from a mirror mounted on a carriage that reciprocates by rebounding between two displaced coil springs to give the required $x$-direction scanning. The substrate is stepped in a $y$ direction after each scan by the laser writing beam. The laser writing beam is modulated by digital information; that is, by a train of stored electrical pulses each representing successive overlapping spots forming a scan line. A coding laser beam is reflected from the carriage through a stationary code plate having alternate transparent and opaque stripes to generate a code signal used to monitor the position of the carriage and to control the modulation of the writing beam.

Since efficiency and economy are prime goals in semiconductor device manufacture, it would clearly be desirable to increase the speed with which a complex mask pattern can be generated. However, because scanning speed depends on the physical velocity of the carriage as it rebounds between oppositely disposed springs, the rate of pattern generation is inherently limited. As a practical matter, pulses or spots can be laser machined at a rate of about 100 kilohertz, and it takes about 40 minutes to generate a typical complex mask pattern.

SUMMARY OF THE INVENTION

It is an object of this invention to increase the rate at which mask patterns can be generated.

This and other objects of the invention are attained in an illustrative embodiment of the type described above in which the laser beam is deflected during its scan so as to laser machine three scan lines simultaneously, rather than only a single scan line. It is a straightforward matter to arrange the stored digital information in the computer to permit such simultaneous scanning. For example, by interspersing the digital information concerning adjacent scan lines, one can laser machine a spot on a first scan line, deflect the laser beam upwardly, machine a corresponding spot on the second scan line, deflect the beam upwardly again to machine a spot on a third scan line, and then return the beam to the successive digital location on the first scan line for machining the second spot of the first scan line. This process is repeated so that at each digital location, the writing beam is stepped to imprint spots on three adjacent scan lines.

In practical implementation, however, serious problems must be overcome. For example, if deflection were done in a straightforward manner, the spots formed on the adjacent scan lines would be mutually displaced because of the velocity of the moving carriage during beam deflection. This, in turn, would undesirably complicate mask pattern design since such design depends on the predictable overlapping of adjacent in horizontal and vertical directions for defining the pattern. We have found that, in using an acoustooptic modulator, this problem can be overcome by orienting the modulator to deflect the beam at an angle of arccot $(1/n)$ with respect to the horizontal scanning direction, where $n$ is the number of scan lines to be simultaneously produced.

The Firtion et al. apparatus is designed to laser machine a pattern during reciprocation in both the positive and negative directions. In order to give proper deflection of the beam along the angle described above, one would have to change the orientation of the modulator each time the direction of horizontal scan changed, a measure which would be cumbersome and inconvenient. However, we have found that by deflecting the beam in the negative time sequence during carriage movement in the negative horizontal direction, one can maintain the appropriate angle described above for accurately compensating for carriage velocity. Thus, in accordance with this feature, the laser beam is first modulated by an increasing staircase wave which steps the beam at a proper angle in the $y$ direction, and is then deflected by a decreasing staircase wave which steps the beam in the $y$ direction during negative horizontal movement of the carriage. The coding signal is advantageously used to control the staircase wave as a function of carriage velocity.

These and other objects, features and advantages of the invention will be better understood from a consideration of the following detailed description, taken in conjunction with the accompanying drawing.

DRAWING DESCRIPTION

DETAILED DESCRIPTION

Figure 1:
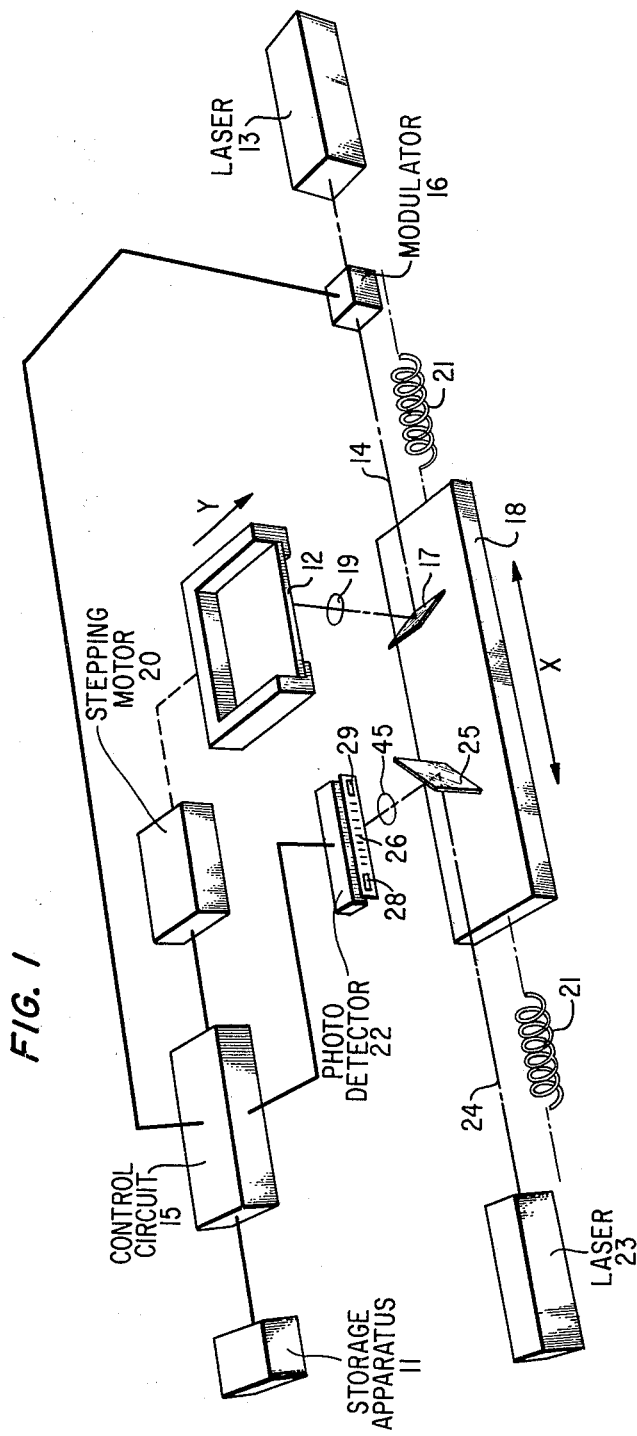
FIG. 1 is a schematic illustration of a pattern generator of the type in which the invention may be used.

Referring now to FIG. 1 there is shown a schematic illustration of a pattern generator of the type in which the invention may be employed. The purpose of the pattern generator is to reproduce the image of a pattern, typically an integrated circuit configuration, which is initially stored as electronic data on an appropriate medium such as magnetic tape in storage apparatus 11. The pattern to be generated typically consists only of transparent and opaque regions represented by the digital data; for example, a positive voltage pulse or a "one" bit represents a transparent spot to be reproduced, while a "zero" bit or the absence of a pulse represents an opaque spot. The information is eventually reproduced on an underside of a workpiece 12 which is exposed to focused light generated by a laser 13. The workpiece may be coated with a film of iron oxide which is selectively evaporated by the focused writing beam 14 to describe the desired pattern.

A control circuit 15 periodically causes electronic data from storage apparatus 11 to be transmitted to an optical modulator 16 where it intensity modulates the writing beam 14. Since the modulation information is digital, it may be used simply to switch the beam off and on; for example, a "zero" bit may cause the writing beam to be deflected off-axis, while a "one" bit permits the writing beam to be transmitted to the workpiece to form a spot, or vice versa. The modulated writing beam is reflected by a mirror mounted on a carriage 18, and after reflection, is focused by a machining lens 19.

Scanning of the major portion of the bottom surface of workpiece 12 by laser beam 14 is accomplished by causing carriage 18 to reciprocate in an $x$ direction as shown, and by stepping workpiece 12 in a $y$ direction after each $x$-direction scan. The workpiece is driven by a stepping motor 20, controlled by the control circuit 15, and the writing machine machines the workpiece as the carriage travels in both positive and negative $x$ directions. As described in more detail in the Firtion et al. application, the $x$-direction reciprocation of carriage 18 is maintained by two oppositely disposed coil springs 21 between which the carriage rebounds. An impulse is applied to each coil spring when it makes contact with the carriage in order to maintain carriage reciprocation along a low friction linear air bearing.

An input to the control circuit 15 is taken from a photodetector 22 which generates a signal indicative of the $x$-direction motion of carriage 18. A laser 23 directs a code beam 24 to a mirror 25 which reflects the beam through a code plate 16 to the photodetector 22. The code plate comprises an array of alternately opaque and transparent regions that alternately obstruct and transmit code beam 24 as the carriage moves in the $x$ direction to generate a pulse train, transmitted to the control circuit 15, which indicates the instantaneous location of the carriage. The termination of each scan line is indicated by code areas 28 and 29 on code plate 26 which in turn controls both the stepping motor 20 and the data for modulating a laser writing beam. Storage apparatus 11 and control circuit 15 may typically comprise a computer which is programmed to accomplish the above functions, as well as such other functions as error detection and correction and provide a visual display from which the pattern generation can be monitored. As an alternative to code areas 28 and 29, an "electric eye" photodetector arrangement can be used to indicate extreme locations of the carriage.

While laser 13 could theoretically take any of a number of different forms it has been found that a YAG (yttrium-aluminum-garnet) laser operated in the "cavity dumped" mode is best suited for machining the iron oxide film. As is known, a laser operated in this manner inherently projects a light beam as a series of pulses. When it is operated to generate an output on the order of two or more watts, as is desired for the operation described, it is most efficiently operated at a minimum rate of about 300 kilohertz. Mechanical considerations, however, dictate that carriage reciprocation in the $x$ direction be at a velocity which corresponds to about 100,000 bits per second, or 100 kilohertz, and during normal operation, this is the pulse frequency generated using photodetector 22 in response to the normal carriage velocity. Thus, when operated in a straightforward manner, two of every three pulses generated by the laser would not be used.

In accordance with the invention, greater efficiency and a faster rate of pattern generation is achieved by forming three scan lines simultaneously during reciprocation in one direction. In other words, rather than simply machining a succession of spots on a single scan line, writing beam 14 is modulated to machine a spot on a first scan line, deflected in the $y$ direction to form a spot on an adjacent scan line, deflected again to machine a spot on a third scan line, and then returned to form the successive digital location on the first scan line. This process is repeated so that at each digital location during carriage reciprocation, the writing beam is stepped to machine spots on three adjacent scan lines. This of course requires that the data be rearranged in storage apparatus 11 from that which would normally occur. That is, data from three adjacent scan lines are interspersed rather than being stored sequentially as would normally be the case, an arrangement that is easily accomplished. However, it is most easily implemented if the simultaneous scanning is only used in those locations at which the information is identical. For example, if three consecutive scan lines are intended to define together a transparent region, all of the constituent spots of the scan lines would be "one" bits, and in this case it would be quite easy to "intersperse" the data of the three scan lines. Since mask patterns are generally defined by relatively large transparent and opaque regions, consecutive scan lines are frequently identical, and significant economies can be achieved by using the invention only where the successive scan lines are identical; where they are non-identical, individual scan lines can be machined independently as before.

The formation of patterns by machining successive spots is predicated on the assumption of a predictable overlap of successive spots both in $x$ and $y$ directions. Simple $y$-direction deflection during carriage reciprocation would result in misregistration of the spots on consecutive scan lines; that is, the successive spots in the $y$ direction would be displaced due to the carriage velocity. To compensate for the carriage velocity and to give vertical registration of the machined spots, the beam is deflected at an angle of arccot $(1/n)$ with respect to the $x$ direction, where $n$ is the number of scan lines being simultaneously machined, in this case, three.

Figure 2:
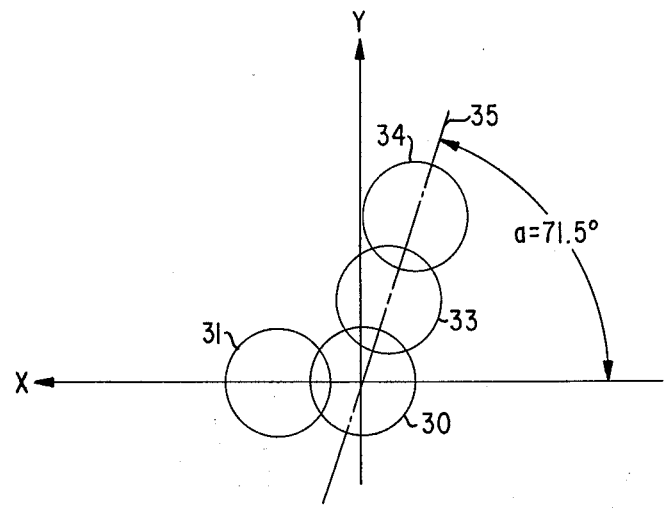
FIG. 2 is a schematic view of laser beam deflection in accordance with one feature of the invention.
Figure 4:
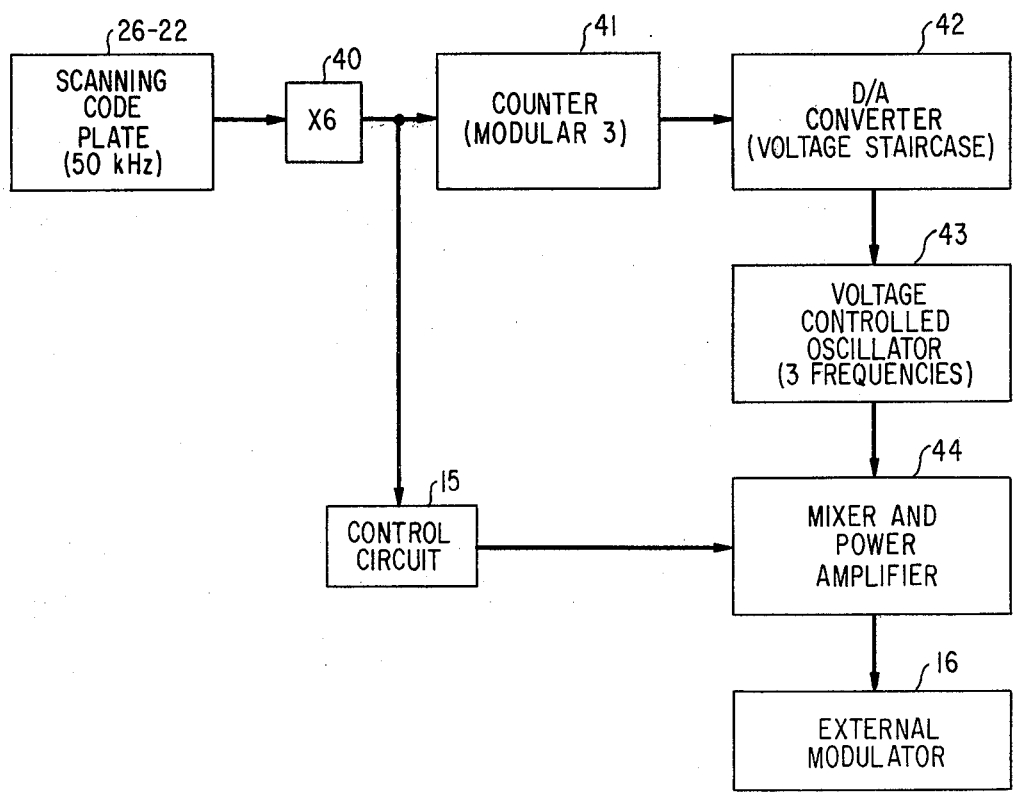
FIG. 4 is a block diagram of the apparatus used for deflecting the laser beam of the apparatus of FIG. 1.

Referring to FIG. 2, successive spots in the $x$ direction are designated as spots 30 and 31. As indicated before, two spots on adjacent scan lines are made between the machining of spots 30 and 31, and if these spots were made by simple vertical deflection in the $y$ direction, misalignment would occur. Instead, the beam is deflected at an angle $a$ equal to arc cotangent $(1/3)$ or $71.5°$. Thus, spot 30 is first machined, then the writing beam is deflected in the $y$ direction at angle $a$ to machine spot 33, then spot 34 of the next superjacent scan line is formed, and then the beam is returned to its original vertical location to machine spot 31, after which the process is repeated. Due to the velocity of the carriage, when the beam is deflected in this manner, the spots 30, 33 and 34 will actually be vertically aligned in the $y$ direction when imprinted on the substrate, rather than being at an angle as shown.

The modulator 16 is preferably an acoustooptic modulator comprising a crystal of tellurium oxide ($TeO_2$), a device well known in the art. As is known, the direction of deflection of the writing beam with this type of modulator depends on the orientation of the crystal axis with respect to the light beam. The angle $a$ is easily obtained by simply rotating the $TeO_2$ crystal to give the deflection angle desired. With this proper orientation, the modulator will deflect the beam in the $y$ direction along line 35 shown in FIG. 2, the extent of deflection depending upon applied frequency, as is known.

Figure 3A:
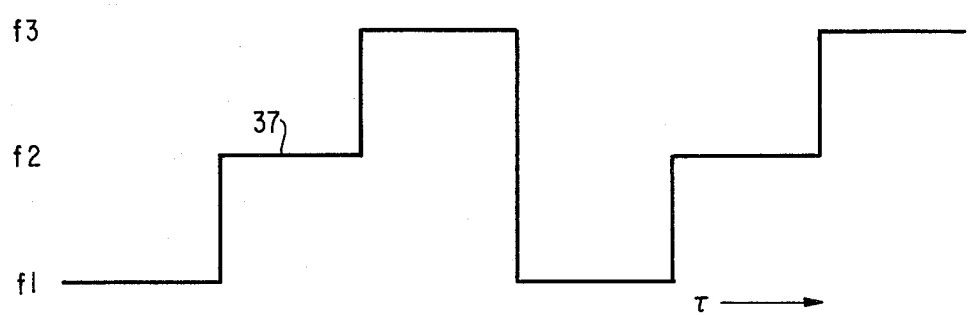
FIGS. 3A and 3B illustrate the staircase waves used in deflecting the laser beam of FIG. 1.

The signal to the modulator 16 is customarily applied through a voltage controlled oscillator so that a high voltage will produce the correspondingly high frequency needed for a large deflection. Curve 37 of FIG. 3A illustrates the staircase voltage needed to deflect the beam as shown in FIG. 2. The lower voltage level corresponds to a frequency f1 for giving spot 30; the next level corresponds to frequency f2 needed for machining spot 33; and the upper level corresponds to relatively high frequency f3 for machining spot 34. As mentioned before, proper orientation of the modulator insures deflection at an angle along line 35.

FIG. 3A shows deflection needed when the carriage is moving in the positive $x$ direction. When the carriage is moving in the negative $x$ direction, deflection of course would have to be along an angle which is the complement of angle $a$. It would greatly complicate the apparatus to reorient the modulator each time the carriage reversed its direction of reciprocation. However, the same effect is conveniently achieved by deflecting the beam in the $y$ direction in reverse order when the carriage is moving in the negative $x$ direction; that is, reversing the direction of deflection of the writing beam. Referring to FIG. 2, when the carriage moves in the negative $x$ direction, the beam is deflected in the $y$ direction along line 35, first forming spot 34, then spot 33, and finally spot 30.

Figure 3B:
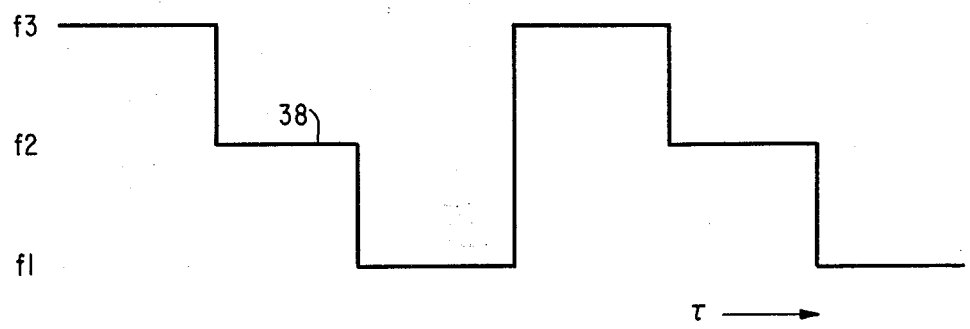

Referring to FIG. 3B, staircase wave 38 is used for deflecting the beam in the $y$ direction during carriage movement in a negative $x$ direction. The initial voltage corresponds to frequency f3 which gives maximum deflection in the $y$ direction and such deflection is reduced to frequency f1, the net result being a progressive deflection downwardly in the negative $y$ direction.

A block diagram of the circuit used for generating staircase waves 37 and 38 is shown in FIG. 5. For convenience, the output frequency of the code plate and photodetector 26–22 is arranged to generate a pulse frequency of 50 kilohertz. This output is multiplied sixfold by a multiplier 40 with the resultant 300 kilohertz signal being directed to a counter 41. As mentioned before, the code plate-photodetector combination 26-22 also detects the change of direction of the carriage, and this information is transmitted both to the control circuit 15 and the counter 41.

The counter 41 generates digits 0, 1, 2 at 300 kilohertz when the carriage is moving in the positive $x$ direction and is responsive to a change of direction signal to generate the digits 2, 1, 0 when the carriage is moving in the negative $x$ direction. This digital information is transmitted to a digital-to-analog converter 42 which generates the voltage staircase represented by curves 37 and 38 of FIGS. 3A and 3B. This in turn is translated to the three frequencies shown in these drawings by a voltage-controlled oscillator 43. These different frequencies are mixed with data from the control circuit 15 in a mixer and amplifier 44 and then transmitted to the modulator 16. As mentioned before, the data supplied by control circuit 15 either permits or does not permit a machined spot.

It is convenient to place the external $TeO_2$ acoustooptic modulator directly in the output path in the laser cavity at which location the laser beam has a diameter (at $1/e^2$ in intensity) of approximately 1.1 millimeters. The velocity of sound in the modulator is 0.61 millimeters/microsecond, so that it takes approximately 1.80 microseconds for sound to cross the writing beam. With a rise time of the voltage controlled oscillator of about 0.5 microseconds, there is ample time in the 3.3 microseconds between laser pulses to fill the aperture and the beam is deflected with negligible degradation.

To produce a spot of 8 to 10 microns in diameter, it is observed that the machining lens 19 is operated at approximately f/5. With a 10X microscope objective having a focal length of 16 millimeters, this implies a writing beam diameter at the entrance pupil of about 3 millimeters. A shorter focal length lens is not desirable because the higher laser power density at the lens could shorten its lifetime. In addition, the reduced working distance could introduce problems of mechanical clearance and possibly deposition of machining debris. It is also desirable that the machining lens be operated telecentrically so that the separation of the three lines of machined spots does not change if the distance between the lens and substrate varies. This condition is effectively satisfied if the chief rays of the three deflected beams coincide at the entrance pupil of the lens 19.

Both of these conditions are satisfied by imaging the modulator at the entrance pupil of the machining lens 19 with a magnification of about 3X. A spherical mirror of 1 meter radius (not shown) may be used as the imaging element instead of a lens, because high reflectivity mirrors are available with losses of only 0.1–0.2 percent. Because of the high $f$ number of the imaging optics, the depth of field is extremely large.

The mirrors used in our apparatus have been found to introduce approximately 6° of image rotation. To compensate for this, the acoustooptic reflector is actually mounted at an angle of 77.5°, which is equal to the sum of 71.5° and 6°.

The foregoing description has demonstrated how advantage can be taken of the relatively high-frequency pulsed output of a cavity-dumped YAG laser to machine three adjacent scan lines simultaneously and to increase significantly the rate at which patterns can be generated. We have found, for example, that the time taken for generating a typical complex integrated circuit mask with our technique can be reduced from about 40 minutes to about 15 minutes. Staircase signals can conveniently be generated for giving the required direction for simultaneous scanning, and a crystal acoustooptic modulator can easily be oriented to give deflection along a proper angle. Scanning can be made during carriage reciprocation in both directions by electrically changing the direction of deflection of the writing beam.

The embodiments described herein are intended to be merely illustrative of the inventive features involved. Various other modifications and features may be made by those skilled in the art without departing from the spirit and scope of the invention.

What is claimed is:

1. An apparatus in which a pattern is formed by raster scanning of a writing beam of radiant energy over a substrate surface, including means for providing relative reciprocating movement between the beam and surface in an $x$ direction, and means for providing relative movement in a $y$ direction orthogonal to the $x$ direction, whereby the pattern is defined by the forming of successive scan lines on the surface, the improvement comprising:

means for forming $n$ scan lines on the surface, where $n$ is a number greater than one, comprising means for deflecting the beam along a line at an angle of substantially arccot (1/n) with respect to the x direction and sequentially forming n spots of said n scan lines, said deflecting means being responsive to the velocity of said relative x direction movement.

2. The improvement of claim 1 wherein:

the means for providing reciprocating x direction movement comprises means for providing movement first in a positive x direction and then in a negative x direction;

and the beam deflecting means comprises means for deflecting the beam along said line successively in a positive y direction during reciprocating movement in the positive x direction, and for deflecting the beam successively in a negative y direction during the reciprocating movement in the negative x direction.

3. The improvement of claim 2 wherein:

the apparatus is of a type in which the writing beam is a laser beam;

and the means for providing relative reciprocating movement comprises a carriage mounted on a linear air bearing.

4. The improvement of claim 3 wherein:

the apparatus is of a type including means for synchronizing modulation of the writing beam with carriage movement comprising a code beam reflected from the moving carriage through a code plate.

5. The improvement of claim 4 wherein:

the apparatus is of a type which includes means for indicating change of direction of the carriage reciprocation;

and further comprising means responsive to said indicated change of direction of reciprocation for changing the direction of deflection of the writing beam.

6. The improvement of claim 5 wherein:

the apparatus is of the type in which a stored digital signal switches the laser writing beam to define a sequence of spots on the surface, each spot corresponding to one bit of information, which constitutes the pattern;

the means for forming n scan lines comprises means for stepping the beam n times along said deflecting line between the formation of successive spots on a single scan line, said stepping being in the positive y direction during reciprocating movement in the positive x direction and in the negative y direction during the reciprocating movement in the negative x direction.

7. The improvement of claim 6 wherein:

the writing beam is deflected by an acoustooptic modulator;

and the stepping means comprises means for generating a positively-extending staircase wave during reciprocating movement in the positive x direction and a negatively-extending staircase wave during reciprocating movement in the negative x direction, each period of the staircase wave having n steps.

8. The improvement of claim 7 wherein:

n equals 3, whereby, during reciprocation in the positive x direction, a positively extending staircase wave permits a spot to be formed on a first scan line in response to a digital information bit, then deflects the beam in a positive y direction at an angle of arccot (1/3) to permit a spot to be formed on a second scan line, deflects the beam again in a positive y direction at arccot (1/3) to permit a spot to be formed on the third scan line, then returns to the first scan line to repeat the sequence until reciprocation in the negative y direction, at which time the staircase wave extend in a negative direction to deflect the beam in a negative y direction at arccot (1/3).

9. The improvement of claim 8 wherein:

the apparatus is of the type employing a pulsed laser for generating the writing beam, and said spots are formed in the substrate by laser machining;

the velocity of relative reciprocating movement yields a repetition rate of successive spots on a single scan line of m per second;

and the maximum power of the laser is at a laser pulse repetition rate of about n(m) per second.

10. The improvement of claim 9 wherein the laser is a cavity-dumped YAG laser having a maximum power output at about 300 kilohertz.

11. In apparatus in which a pattern is formed by raster scanning of a writing beam of radiant energy over a substrate surface, including means for digitally modulating the writing beam to form a succession of overlapping spot locations, means for providing relative reciprocating movement between the beam and surface in an x direction, and means for providing relative movement in a y direction orthogonal to the x direction, whereby each scan line is defined by a succession of spot locations and the pattern is formed by successive scan lines on the surface, the improvement comprising:

means for forming n scan lines comprising means for stepping the beam n times in the y direction between the formation of successive spots on a single scan line;

the beam deflecting means comprising means for deflecting the beam in a positive y direction during relative reciprocating movement in the positive x direction, and for deflecting the beam in a negative direction during reciprocating movement in a negative x direction.

12. The improvement of claim 11 wherein:

the apparatus is of a type in which the writing beam is a laser beam;

the stepping means comprises means for generating a positively-extending staircase wave during reciprocating movement in the positive x direction and a negatively-extending staircase wave during reciprocating movement in the negative x direction, each period of the staircase wave having n steps.

13. The improvement of claim 12 wherein:

the stepping means comprises means for deflecting the beam along a line at an angle of substantially arccot (1/n) with respect to the x direction, said deflecting means being responsive to the velocity of said x-direction movement.

14. The improvement of claim 13 wherein:

the apparatus is of a type in which the relative reciprocating movement comprises a reciprocating carriage mounted on a linear bearing;

means for generating a code signal to synchronize modulation of the writing beam with carriage movement comprising a code beam reflected from the moving carriage through a code plate;

and wherein the means for generating the staircase wave is connected to the code signal generating means and is responsive to said code signal.

* * * * *